United States Patent
Yoshioka et al.

(10) Patent No.: US 11,058,075 B2
(45) Date of Patent: *Jul. 13, 2021

(54) PLANT CULTIVATION SYSTEM AND A METHOD FOR PLANT CULTIVATION

(71) Applicant: MEBIOL INC., Hiratsuka (JP)

(72) Inventors: Hiroshi Yoshioka, Hadano (JP); Yuichi Mori, Yokohama (JP); Akihiro Okamoto, Yokohama (JP); Shigeki Miura, Tokorozawa (JP); Tomoyoshi Mizutani, Osaka (JP)

(73) Assignee: MEBIOL INC., Hiratsuka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,055

(22) Filed: Apr. 17, 2020

(65) Prior Publication Data

US 2020/0260671 A1   Aug. 20, 2020

Related U.S. Application Data

(62) Division of application No. 14/913,125, filed as application No. PCT/JP2014/071141 on Aug. 11, 2014, now Pat. No. 10,660,280.

(30) Foreign Application Priority Data

Aug. 19, 2013 (JP) .................................. 2013-169317

(51) Int. Cl.
   *A01G 31/02*  (2006.01)
   *A01G 31/00*  (2018.01)
   *A01G 25/02*  (2006.01)

(52) U.S. Cl.
   CPC .......... *A01G 31/02* (2013.01); *A01G 25/023* (2013.01); *A01G 31/00* (2013.01); *Y02P 60/21* (2015.11)

(58) Field of Classification Search
   CPC ............ A01G 13/0268; A01G 13/0275; A01G 31/00; A01G 31/02; A01G 25/023
   USPC ...................................... 47/59 R, 59 S, 62 R
   See application file for complete search history.

(56) References Cited

U.S. PATENT DOCUMENTS

| 3,798,836 | A | 3/1974 | Rubens et al. |
| 3,973,355 | A | 8/1976 | McKenzie |
| 4,155,971 | A | 5/1979 | Wysong |
| 10,660,280 | B2 * | 5/2020 | Yoshioka ............. A01G 25/023 |
| 2006/0112632 | A1 | 6/2006 | Mori et al. |
| 2007/0014976 | A1 | 1/2007 | Matsudo |
| 2010/0186298 | A1 | 7/2010 | Okamoto et al. |
| 2014/0150338 | A1 | 6/2014 | Takafuji et al. |
| 2016/0044880 | A1 * | 2/2016 | Matsuno ................ A01G 31/02 47/62 A |

FOREIGN PATENT DOCUMENTS

| JP | 2005-102508 A | 4/2005 |
| JP | 2008-61503 A | 3/2008 |
| JP | 2008-182909 A | 8/2008 |
| JP | 2008-193980 A | 8/2008 |
| JP | 4142725 B1 | 9/2008 |
| JP | 4425244 B2 | 3/2010 |
| JP | 2011-194697 A | 10/2011 |
| JP | 2012-170396 A | 9/2012 |
| WO | WO 2004/064499 A1 | 8/2004 |
| WO | WO 2012/043192 A1 | 4/2012 |

OTHER PUBLICATIONS

English-language translation of JP 4425244 B2 (Year: 2010).*
Das et al., "Preparation and characterization of cross-linked starch/poly (vinyl alcohol) green films with low moisture absorption," Industrial & Engineering Chemistry Research, vol. 49, 2010, pp. 2176-2185.
English Translation of International Search Report (Form PCT/ISA/210), dated Oct. 28, 2014, for International Application No. PCT/JP2014/071141.
English Translation of Written Opinion of the International Searching Authority (Form PCT/ISA/237), dated Oct. 28, 2014, for International Application No. PCT/JP2014/071141.
Mao et al., "Extruded cornstarch-glycerol-polyvinyl alcohol blends: mechanical properties, morphology and biodegradability," Journal of Polymers and the Environment, vol. 8, No. 4, 2000, pp. 205-211.
Mohamed, "AC conductivity and dielectric constant of poly (vinyl alcohol) doped with $MnSO_4$," Journal of Physics and Chemistry of Solids, vol. 61, 2000, pp. 1357-1361.

* cited by examiner

*Primary Examiner* — Lisa L Tsang
(74) *Attorney, Agent, or Firm* — Birch, Stewart, Kolasch & Birch, LLP (57) ABSTRACT

Prior art technology has a problem in that when a plant is cultivated for a long period of time on a PVA film having its lower surface positioned in contact with a nutrient fluid, plant roots that have formed penetrate through the film. A plant cultivation system wherein the PVA film has an equilibrium degree of swelling in the range of from 125 to 250% as measured in water at 30° C. and has a loss tangent (tan δ) in the range of from 0.005 to 0.2 as measured in an equilibrium swollen state in water at 30° C., and a method for cultivating a plant by using this plant cultivation system. Plant cultivation can be performed for a long period of time while avoiding infection by bacteria and the like causative of plant diseases. Therefore, the present invention is useful in, e.g., agriculture and the manufacture of pharmaceuticals.

7 Claims, 1 Drawing Sheet

PLANT CULTIVATION SYSTEM AND A METHOD FOR PLANT CULTIVATION

CROSS-REFERENCE TO RELATED APPLICATIONS

This application is a Divisional application of application Ser. No. 14/913,125, filed on Feb. 19, 2016, which is the National Phase under 35 U.S.C. § 371 of International Application No. PCT/JP2014/071141, filed on Aug. 11, 2014, which claims the benefit under 35 U.S.C. § 119(a) to Patent Application No. 2013-169317, filed in Japan on Aug. 19, 2013, all of which are hereby expressly incorporated by reference into the present application.

FIELD OF THE INVENTION

The present invention relates to a plant cultivation system and a method for plant cultivation, the system and method employing a nonporous hydrophilic film, especially a polyvinyl alcohol (PVA) film.

PRIOR ART

The present inventors have long made various studies on nutrient fluid cultivation technology using a nonporous hydrophilic film, and have disclosed the following plant cultivation systems and plant cultivation methods: a plant cultivation device and a plant cultivation method both using a technology wherein a plant is cultivated on a nonporous hydrophilic film disposed in contact with a nutrient fluid while allowing the film to be integrated with the roots of the plant (Patent Document 1); a plant cultivation device and a plant cultivation method both using a technology wherein an irrigation is also performed from above the nonporous hydrophilic film (Patent Document 2); a plant cultivation system using a technology wherein the nonporous hydrophilic film is continuously transferred along and in contact with a nutrient fluid (Patent Document 3); a plant cultivation system using a technology wherein an evaporation suppression material is disposed, through a layer of air, above the nonporous hydrophilic film (Patent Document 4); and a plant cultivation system using a technology wherein a nutrient fluid is continuously fed to the lower surface of the nonporous hydrophilic film (Patent Document 5).
Patent Document 1: Japanese Patent Application Prior-to-Examination Publication (Saihyo) No. 2004-64499
Patent Document 2: Japanese Patent No. 4425244
Patent Document 3: Unexamined Japanese Patent Application Laid-Open Specification No. 2008-182909
Patent Document 4: Unexamined Japanese Patent Application Laid-Open Specification No. 2008-193980
Patent Document 5: Japanese Patent No. 4142725

DISCLOSURE OF THE INVENTION

Problems to be Solved by the Invention

However, the plant cultivation systems of Patent Documents 1 to 5 have a problem in that when a plant forming strong roots is cultivated for a long period of time on the nonporous hydrophilic film having its lower surface positioned in contact with a nutrient fluid, plant roots that have formed in close contact with the film penetrate through the film.

When plant roots penetrate through the film, the plant roots directly contact with the nutrient fluid and hence are exposed to infection by bacteria and viruses having propagated in the nutrient fluid, thus rendering it impossible to cultivate the plant in a healthy condition.

Further, when plant roots penetrate through the film, a hole is formed in the film and causes the nutrient fluid to flow therethrough into the upper surface of the film, leading to the occurrence of root rot, thus rendering it impossible to cultivate the plant in a healthy condition.

Furthermore, when plant roots penetrate through the film, the plant roots directly contact with the nutrient fluid, thus rendering it impossible to apply to the plant a satisfactory degree of water stress (that is a stress applied by causing the plant to absorb water through the film), leading to the occurrence of a lowering of the quality of the plant.

Also, as described in Patent Document 6, to prevent plant roots from penetrating through the film, it is necessary for the film to have a thickness of at least 60 μm. When the film thickness is increased, there are posed problems not only in that the permeation rate of the nutrient fluid is lowered, leading to the occurrence of growth inhibition of the plant, but also in that the production cost of the film becomes high.
Patent Document 6: Unexamined Japanese Patent Application Laid-Open Specification No. 2008-61503

Means to Solve the Problems

In this situation, the present inventors have made extensive and intensive studies with a view toward solving the above-mentioned problems. As a result, it has unexpectedly been found that a polyvinyl alcohol (PVA) film exhibiting an excellent absorption and permeability of water or a nutrient fluid can be achieved by causing a PVA film to have an equilibrium degree of swelling in the range of from 125 to 250% as measured in water at 30° C.

Further, in addition to the above-mentioned property, the present inventors have also paid attention to the viscoelastic property of a polyvinyl alcohol (PVA) film, especially the loss tangent (tan δ) thereof at 1 Hz, exhibited in water at a predetermined temperature, and have found that a PVA film exhibiting an excellent film strength suitable for plant cultivation can be achieved by causing a PVA film to have a loss tangent (tan δ) in the range of from 0.005 to 0.2 as measured in an equilibrium swollen state in water at 30° C. Based on these findings, the present invention has been completed.

More specifically, the present invention provides the following.
1) A plant cultivation system comprising:
a polyvinyl alcohol (PVA) film for cultivating a plant thereon, and
a nutrient fluid retaining means disposed to be in contact with the lower surface of the PVA film,
wherein the PVA film has an equilibrium degree of swelling in the range of from 125 to 250% as measured in water at 30° C. and has a loss tangent (tan δ) in the range of from 0.005 to 0.2 as measured in an equilibrium swollen state in water at 30° C.
2) The plant cultivation system according to item 1 above, wherein the PVA film is a biaxially oriented PVA film.
3) The plant cultivation system according to item 1 or 2 above, wherein the PVA film has a dry thickness of from 5 to 100 μm.
4) The plant cultivation system according to any one of items 1 to 3 above, wherein the nutrient fluid retaining means is a hydroponic tank accommodating a nutrient fluid which is disposed to be in contact with the lower surface of the PVA film.

5) The plant cultivation system according to any one of items 1 to 3 above, wherein the nutrient fluid retaining means is a material having a water impermeable surface on or above which the PVA film is disposed, and wherein the plant cultivation system further comprises a nutrient fluid feeding means for continuously or intermittently feeding a nutrient fluid to a position between the PVA film and the nutrient fluid retaining means.

6) The plant cultivation system according to item 5 above, wherein the nutrient fluid feeding means comprises a drip irrigation tube disposed between the PVA film and the nutrient fluid retaining means.

7) A method for cultivating a plant, which comprises:
(1) providing a plant cultivation system comprising:
   a PVA film for cultivating a plant thereon, and
   a nutrient fluid retaining means disposed to be in contact with the lower surface of the PVA film,
   wherein the PVA film has an equilibrium degree of swelling in the range of from 125 to 250% as measured in water at 30° C. and has a loss tangent (tan δ) in the range of from 0.005 to 0.2 as measured in an equilibrium swollen state in water at 30° C.,
(2) placing a plant on the PVA film of the plant cultivation system, and
(3) causing a nutrient fluid to be in contact with the plant through the PVA film, thereby cultivating the plant on the PVA film.

Effects of the Invention

By performing plant cultivation using the plant cultivation system of the present invention employing a PVA film having not only excellent absorption and permeability of water or a nutrient fluid, but also excellent film strength, plant roots can be caused to absorb satisfactory amounts of nutrient components for a long period of time efficiently and stably while avoiding infection by bacteria and the like causative of plant diseases and also preventing plant roots from suffering oxygen deficiency causative of root rot and the like, thereby rendering it possible to remarkably promote plant growth continually for a long period of time.

BEST MODE FOR CARRYING OUT THE INVENTION

Hereinbelow, the present invention will be explained more illustratively.

The PVA film used in the present invention is produced from PVA as a raw material. The method for producing PVA is not particularly limited, and PVA can be produced by known methods. That is, PVA can be obtained by a method comprising polymerizing a vinyl ester compound and saponifying the resultant vinyl ester polymer.

Examples of vinyl ester compounds include vinyl formate, vinyl acetate, trifluorovinyl acetate, vinyl propionate, vinyl butyrate, vinyl caprate, vinyl laurate, vinyl versatate, vinyl palmitate, and vinyl stearate. These vinyl ester compounds can be used alone or in combination. Among the above-mentioned vinyl ester compounds, vinyl acetate is preferred from the practical viewpoint.

In the present invention, in addition to vinyl. ester compounds, comonomers may be copolymerized in an amount of from about 0.5 to about 10 mol %, as long as the object of the present invention is not adversely affected. Examples of comonomers include olefins, such as propylene, isobutylene, α-octene, α-dodecene, and α-octadecene; unsaturated acids, such as acrylic acid, methacrylic acid, crotonic acid, maleic acid, maleic anhydride, and itaconic acid, salts of unsaturated acids, and mono- or dialkyl esters of unsaturated acids; nitriles, such as acrylonitrile, and methacrylonitrile; amides, such as acrylamide, and methacrylamide; olefin sulfonic acids, such as ethylene sulfonic acids, allyl sulfonic acid, and methallyl sulfonic acid, and salts of olefin sulfonic acids; alkyl vinyl ethers, N-acrylamide methyltrimethylammonium chloride, allyltrimethylammonium chloride, dimethyldiallylammonium chloride, dimethylallyl vinyl ketone, N-vinylpyrrolidone, vinyl chloride, vinylidene chloride; polyoxyalkylene (meth)allyl ethers, such as polyoxyethylene (meth)allyl ether, and polyoxypropylene (meth)allyl ether; polyoxyalkylene (meth)acrylates, such as polyoxyethylene (meth)acrylate, and polyoxypropylene (meth)acrylate; polyoxyalkylene (meth)acrylamides, such as polyoxyethylene (meth)acrylamide, and polyoxypropylene (meth)acrylamide; polyoxyethylene (1-(meth)acrylamide-1,1-dimethylpropyl) ester, polyoxyethylene vinyl ether, polyoxypropylene vinyl ether, polyoxyethylene allyl amine, polyoxypropylene allyl amine, polyoxyethylene vinyl amine, polyoxypropylene vinyl amine, 3,4-diacetoxy-1-butene, vinyl ethyl carbonate, and isopropenyl acetate.

With respect to the method for performing polymerization (or copolymerization), there is no particular limitation. Any known polymerization methods can be used. However, in general, there is employed a solution polymerization using, as a solvent, an alcohol, such as methanol, ethanol, or isopropyl alcohol. Of course, emulsion polymerization or suspension polymerization may be used.

The polymerization reaction is performed using a known radical polymerization catalyst, such as azobisisobutyronitrile, acetyl peroxide, benzoyl peroxide, or lauroyl peroxide. The reaction temperature is selected in the range of from 35 to 200° C. (more preferably from 50 to 80° C.).

The saponification of the obtained vinyl ester polymer is performed by a method in which the vinyl ester polymer is dissolved in an alcohol or in a mixed solvent composed of an alcohol and a fatty acid ester, and the saponification reaction is conducted in the presence of an alkali catalyst. Examples of alcohols include methanol, ethanol, and butanol. Examples of fatty acid esters as solvents include methyl acetate, ethyl acetate, and butyl acetate. Also, other solvents, such as benzene and hexane, may be used in combination with fatty acid esters. The concentration of the vinyl ester copolymer in the mixture thereof with an alcohol is selected in the range of from 20 to 50% by weight.

As saponification catalysts, there can be used alkali catalysts, and examples of alkali catalysts include alkali metal hydroxides and alcoholates, such as sodium hydroxide, potassium hydroxide, sodium methylate, sodium ethylate, and potassium methylate. The catalyst is used in an amount of from 1 to 100 millimolar equivalent, relative to the vinyl ester copolymer. If desired, the saponification may be performed using an acid catalyst, such as hydrochloric acid, sulfuric acid or p-toluenesulfonic acid.

The saponification degree of the PVA is preferably 90 mol % or more (more preferably 95 mol % or more, and still more preferably 99 mol % or more). When the saponification degree of the PVA is less than 90 mol %, the water resistance of the PVA is possibly lowered, disadvantageously.

The average polymerization degree of the PVA is preferably 1,100 or more (more preferably from 1,300 to 4,500, and still more preferably from 1,300 to 4,200). When the average polymerization degree is less than 1,100, it is possible that the PVA does not exhibit a satisfactory film strength and is likely to undergo breakage or the like, disadvantageously. The average polymerization degree used in the present specification is an average polymerization degree measured in accordance with JIS K6726.

With respect to the PVA used in the present invention, it is preferred that the content of sodium acetate has been adjusted to 0.8% by weight or less (more advantageously 0.5% by weight or less), from the viewpoint of improving heat resistance and discoloration resistance.

With respect to the method for producing a film using the PVA, there is no particular limitation. The film can be produced by known methods. Production examples will be described later, but they are not meant to be limiting on the scope of the present invention. The PVA solution used for producing a film (film formation) may be, for example, an aqueous PVA solution having a PVA content (concentration) of from 5 to 70% by weight (preferably from 10 to 60% by weight).

If desired, the above-mentioned aqueous PVA solution may be appropriately incorporated with ordinary additives. Examples of such additives include polyhydric alcohols, such as ethylene glycol, glycerol, polyethylene glycol, diethylene glycol, and triethylene glycol; antioxidants, such as phenols and amines; stabilizers, such as phosphoric esters; colorants, fragrances, fillers/extenders, antifoaming agents, release agents, ultraviolet absorbers, inorganic powders, and surfactants. Further, there may be added water soluble resins other than polyvinyl alcohol, such as starch, carboxymethyl cellulose, methyl cellulose, and hydroxymethyl cellulose.

The thus prepared aqueous PVA solution is subjected to film formation using a film forming machine (extruder). The melt-kneading temperature in the extruder is preferably in the range of from 55 to 140° C. (more preferably from 55 to 130° C.). When the melt-kneading temperature is less than 55° C., there occurs a lowering of the film surface condition. When the melt-kneading temperature is more than 140° C., a foaming occurs. The extruded film is subjected to drying. The drying temperature is preferably in the range of from 70 to 120° C. (more preferably from 80 to 100° C.). When the drying temperature is less than 70° C., problems occur in that the drying requires too much time, or too much moisture remains even after the drying. When the drying temperature is more than 120° C., the film becomes poor in flexibility, possibly resulting in the occurrence of difficulty in the subsequent stretch orientation step.

To obtain a PVA film, the aqueous PVA solution may be directly subjected to film formation. However, if desired, before use in film formation, the aqueous PVA solution may be first subjected to pelletization or flaking. Then, the resultant pellets or flakes can be fed to an extruder to perform film formation.

The PVA film obtained by the above-described method can be used in the plant cultivation system of the present invention. However, from the viewpoint of imparting to the PVA film stabilized properties with respect to flexibility and mechanical strength, it is preferred that the PVA film is subjected to stretch orientation treatment. The stretch orientation treatment is described below.

The stretch orientation treatment may be performed so as to effect a monoaxial orientation in the lengthwise direction (machine direction) only. However, from the viewpoint of improving the above-mentioned properties, it is preferred that the stretch orientation treatment is performed so as to effect a biaxial orientation in both the lengthwise and transverse directions. The biaxial stretch orientation treatment may be performed with any of a sequential biaxial stretching and a simultaneous biaxial stretching. In the case of the biaxial stretch orientation treatment, it is preferred that the water content of the PVA film before the stretch orientation treatment has been adjusted to a value in the range of from 5 to 30% by weight (more advantageously from 20 to 30% by weight). When the water content of the PVA film is outside of this range, the stretch ratio cannot be raised to a maximum level. The method for adjusting the water content of the PVA film is not particularly limited. The adjustment of the water content of the PVA film can be performed by, for example, a method in which the drying operation is performed so as to achieve the desired water content, or a method in which a PVA film having a water content of less than 5% by weight is subjected either to immersion in water or to treatment in a moisture-conditioned atmosphere so as to achieve the desired water content.

With respect to the stretch ratio, there is no particular limitation. However, it is preferred that the stretch ratio in the lengthwise direction is in the range of from 1.5 to 5.0 times, more advantageously from 2.0 to 5.0 times, and that the stretch ratio in the transverse direction is in the range of from 1.5 to 5.0 times, more advantageously from 2.0 to 5.0 times. When the stretch ratio in the lengthwise direction is less than 1.5 times, improvement in properties (i.e., decrease in loss tangent (tan $\delta$) as measured in a swollen state in water) is unlikely to be obtained. When the stretch ratio in the lengthwise direction is more than 5.0 times, a splitting in the lengthwise direction is likely to occur. When the stretch ratio in the transverse direction is less than 1.5 times, improvement in properties (i.e., decrease in loss tangent (tan $\delta$) as measured in a swollen state in water) is unlikely to be obtained. When the stretch ratio in the transverse direction is more than 5.0 times, a break of the film will occur.

After the step of the biaxial stretch orientation treatment, it is preferred to perform heat fixing. The temperature for heat fixing is preferably a temperature which is lower than the melting temperature of polyvinyl alcohol. However, when the temperature for heat fixing is lower than the melting temperature of polyvinyl alcohol by 80° C. or more, problems are posed in that dimensional stability is poor and shrinkage becomes great. On the other hand, when the temperature for heat fixing is higher than the melting temperature of polyvinyl alcohol, the film thickness becomes greatly varied. For example, when the polyvinyl alcohol is a saponification product of a vinyl acetate homopolymer, the temperature for heat fixing is preferably in the range of from 140 to 250° C. and the time for heat fixing is preferably in the range of from 1 to 30 seconds, more preferably from 5 to 10 seconds.

With respect to the PVA film, the higher the temperature for heat fixing and the longer the time for heat fixing, the smaller the loss tangent (tan $\delta$) as measured in a swollen state in water. Therefore, by controlling appropriately the temperature and time for heat fixing, a desired value of the properties, i.e., the loss tangent (tan $\delta$) as measured in a swollen state in water, can be obtained. The heat fixing may be performed either in a single step or in a plurality of steps using different temperatures and different times. From the viewpoint of ease in obtaining a desired value of the properties, i.e., the loss tangent (tan $\delta$) as measured in a swollen state in water, it is preferred that the heat fixing is performed in a plurality of steps.

If desired, the biaxially oriented PVA film obtained may be subjected to washing with water and drying. The method for performing washing and the method for performing drying are not particularly limited. For example, washing and drying can be performed by a method in which the PVA film is immersed in a water bath at an appropriate temperature to cause the PVA film to absorb water, and the PVA film is taken out from the water bath and blown with air at room temperature or an elevated temperature to dry the PVA film, thereby adjusting the water content of the PVA film to a desired value.

It is preferred that the PVA film used in the present invention has a thickness of from 5 to 100 μm (more advantageously from 10 to 60 μm). When the film thickness is less than the above-mentioned range, the PVA film is unlikely to resist penetration by plant roots. When the film thickness is more than the above-mentioned range, the permeation of fertilizer components through the PVA film requires too much time. The above-mentioned range is also advantageous from the viewpoint of commercial productivity.

It is preferred that the PVA film used in the present invention has an equilibrium degree of swelling in the range of from 125 to 250%, more advantageously from 150 to 200%, as measured in water at 30° C. When the equilibrium degree of swelling of the PVA film is less than the above-mentioned range, the permeation of water and fertilizer components through the PVA film becomes unsatisfactory, thus retarding the growth rate of a plant. On the other hand, when the equilibrium degree of swelling of the PVA film is more than the above-mentioned range, the strength of the PVA film in water is lowered, so that the PVA film is unlikely to resist penetration by plant roots.

The equilibrium degree of swelling of the PVA film in water at 30° C. is measured as follows. First, a PVA film having a square shape of 20 cm×20 cm is cut out from a PVA film in dry state, and its weight (a) (in the unit g) is measured. Next, the cut-out PVA film is immersed and left in water at 30° C. for 30 minutes. Subsequently, the PVA film is taken out from the water, excess water on the surface of the PVA film is quickly wiped off, and the weight (b) (in the unit g) of the PVA film is measured. The equilibrium degree of swelling is calculated by the formula: b/a×100%.

A dynamic viscoelastic behavior which is required of the PVA film used in the present invention is such that the storage elastic modulus (G') of the PVA film as measured in an equilibrium swollen state in water at 30° C. is in the range of from 5,000 to 100,000 Pa, more preferably from 10,000 to 80,000 Pa.

Another dynamic viscoelastic behavior which is required of the PVA film used in the present invention is such that the loss elastic modulus (G") of the PVA film as measured in an equilibrium swollen state in water at 30° C. is in the range of from 100 to 10,000 Pa, more preferably from 300 to 8,000 Pa.

Still another dynamic viscoelastic behavior which is required of the PVA film used in the present invention is such that the loss tangent (tan δ) (that is the ratio (G"/G') of loss elastic modulus (G") to storage elastic modulus (G')) of the PVA film is in the range of from 0.005 to 0.2, more preferably from 0.01 to 0.1, as measured in an equilibrium swollen state in water at 30° C.

When the loss tangent (tan δ) of the PVA film as measured in an equilibrium swollen state in water at 30° C. is more than the above-mentioned range, root penetration through the PVA film is likely to occur. On the other hand, when the loss tangent (tan δ) of the PVA film as measured in an equilibrium swollen state in water at 30° C. is less than the above-mentioned range, the film becomes poor in flexibility and is likely to undergo brittle fracture.

A PVA film swollen with water is a hydrogel and behaves as a viscoelastic body. When a stress is applied to a viscoelastic body to deform it, most part of the applied stress is stored as internal deformation energy, which in turn acts as a driving force of restoration upon removing the applied stress. However, a part of the applied stress is consumed through the internal friction of molecular movement due to deformation and is finally converted into heat. A value indicating the magnitude of this internal friction is loss tangent (tan δ).

Therefore, the fact that a PVA film swollen with water has a small value of loss tangent (tan δ) means that the PVA film has a strong property to restore its original shape after being deformed. Conversely speaking, the fact that a PVA film swollen with water has a large value of loss tangent (tan δ) means that, when deforming stress is applied to the water-swollen PVA film, the PVA film is likely to undergo a molecular movement in itself, and the stress is relieved by deformation.

It is considered that penetration by plant roots through a PVA film occurs in the way described below. The roots placed in close contact with the film grow downwardly in search of nutrient components present below the lower surface of the film while dragging the film downwardly. In this process, the root growth generates a stress in the film. In the case where the PVA film has a large value of loss tangent (tan δ), the PVA film undergoes a molecular movement in itself and thus relieves the stress by deformation. The PVA film having a great value of loss tangent (tan δ) continues to undergo such deformation and is finally penetrated through by the roots. That is, the PVA film swollen with water leads to ductile fracture.

On the other hand, in the case where the PVA film swollen with water has a small value of loss tangent (tan δ), although the growth of the plant roots placed in close contact with the film generates a stress in the film, most of the stress is stored in the film as internal deformation energy. The plant roots continue to grow and extend in search of a new contact point on the film. When the growing point of the roots finds and adheres to a new contact point, the stress which has been exerted by the plant roots on the PVA film is removed, and the film restores its original shape by the stored internal deformation energy. Thus, it is considered that, in the case where the water-swollen PVA film has a small value of loss tangent (tan δ), penetration by plant roots through the film is avoided.

In the present invention, the dynamic viscoelastic behavior of a PVA film in an equilibrium swollen state in water is measured by the following method. A PVA film is immersed in water at 30° C. for 30 minutes. To the thus treated PVA film is applied a vibration at 1 Hz in an environment of saturated water vapor at 30° C., and the PVA film is subjected to measurement of storage elastic modulus (G'), loss elastic modulus (G") and loss tangent (tan δ).

In the present invention, the dynamic viscoelastic behavior of a PVA film in an equilibrium swollen state in water is measured by means of a stress control type viscoelastic measuring apparatus (rheometer AR-500, manufactured and sold by TA Instruments Japan Inc.).

Shape and size of the measurement cell: stainless steel parallel discs (diameter: 4.0 cm) with an aluminum solvent trap Measurement frequency: 1 Hz Measurement temperature: 30° C.

Applied stress and displacement: In a linear region. Specifically, for example, the applied stress is from 10 to 200 Pa, and the displacement is from $10^{-6}$ to $10^{-5}$ radian.

The specific procedure is as follows.

1) A PVA film to be subjected to measurement is immersed in water at 30° C. for 30 minutes.

2) The PVA film having reached an equilibrium swollen state by the above-mentioned operation is taken out from the water, and a circular film having a diameter of 4 cm is cut out therefrom so as to be fitted in stainless steel parallel discs (diameter: 4.0 cm) which are used as a measurement device.
3) The solvent trap and water as a solvent are placed on the measurement device while maintaining the film in close contact with the measurement device, and the resultant system is mounted on the measuring apparatus.
4) The measurement stage is elevated, the PVA film to be subjected to the measurement is sandwiched between the measurement device and the measurement stage, and the gap is adjusted so as for the film to be in close contact with the measurement device and the measurement stage. During this operation, care is taken to ensure that no slip occurs among the PVA film, the measurement device and the measurement stage, and that the film is not compressed.
5) The temperature of the measurement stage is set at 30° C., and the dynamic viscoelasticity is measured at a measuring frequency of 1 Hz under conditions such that the stress and displacement are in a linear region.

In the present invention, the PVA film produced in the above-mentioned manner is used in the plant cultivation system to cultivate a plant. The plant cultivation system and the method for plant cultivation are specifically explained below.

<Plant Cultivation System>

In the plant cultivation system of the present invention, the PVA film is common. However, depending on the type of the nutrient fluid retaining means, the plant cultivation system of the present invention is roughly classified into 2 types. Type 1 is a plant cultivation system wherein the nutrient fluid retaining means is a hydroponic tank accommodating a nutrient fluid which is disposed to be in contact with the lower surface of the PVA film. This type of plant cultivation system is disclosed in Patent Document 1.

Type 2 is a plant cultivation system wherein the nutrient fluid retaining means is a material having a water impermeable surface on or above which the PVA film is disposed, and wherein the plant cultivation system further comprises a nutrient fluid feeding means for continuously or intermittently feeding a nutrient fluid to a position between the PVA film and the nutrient fluid retaining means. A representative example of the nutrient fluid feeding means is a drip irrigation tube disposed between the PVA film and the nutrient fluid retaining means. That is, Type 2 of plant cultivation system has a multilayer structure wherein the PVA film is directly or indirectly disposed on or above the nutrient fluid retaining means used as a substrate layer. This type of plant cultivation system is disclosed in Patent Document 5.

Figure 1:
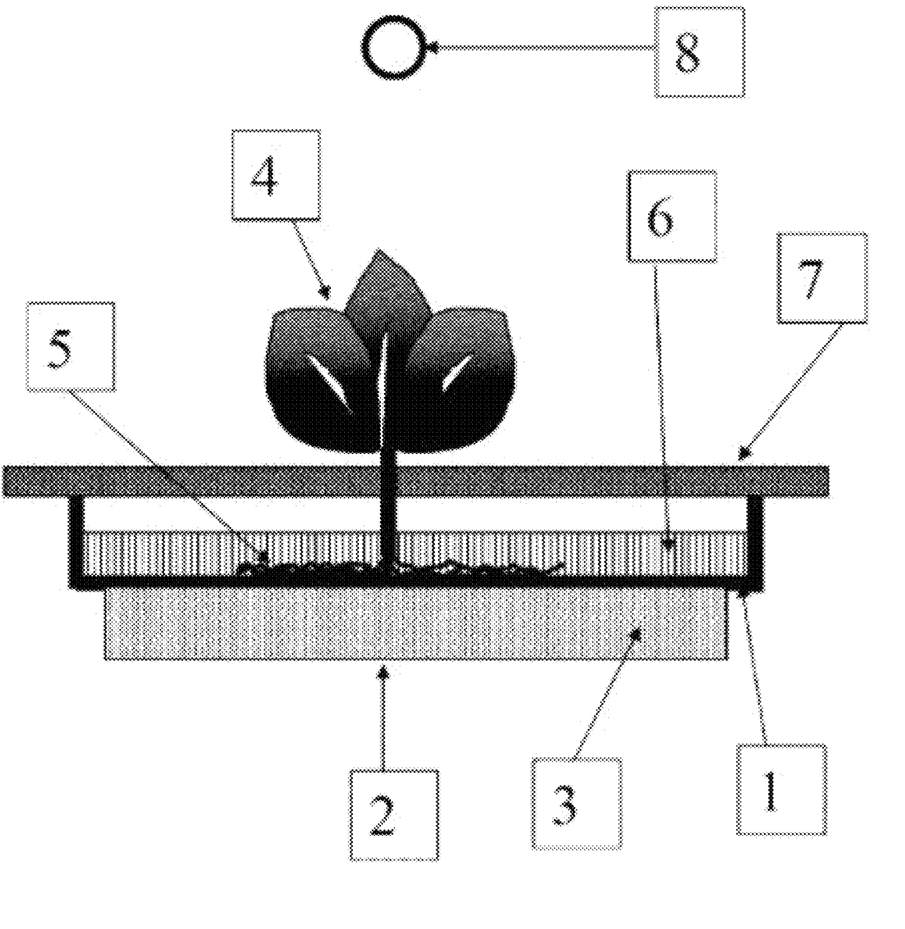
FIG. 1 A schematic cross-sectional view of an example of a basic embodiment of the plant cultivation system of the present invention.

FIG. 1 is a schematic cross-sectional view of an example of a basic embodiment of Type 1 of plant cultivation system. In the plant cultivation system of FIG. 1, a hydroponic tank (2) accommodating a nutrient fluid (3) containing fertilizer components is disposed below the PVA film (1) of the present invention. The nutrient fluid (3) is absorbed by the PVA film (1). The roots (5) of a plant (4) are positioned in close contact with the upper surface of the PVA film (1) and are allowed to absorb the water and fertilizer components contained in the PVA film (1).

If desired, a plant cultivation support (6) (such as soil) and/or an evaporation suppression material (e.g., the below-mentioned mulching material) (which is either impervious or semi-pervious to water vapor) or a planting plate (7) may be disposed on or above the PVA film (1). By disposing a plant cultivation support (6) on or above the PVA film (1), the effect of protecting plant roots can be achieved. In addition, the use of an evaporation suppression material or planting plate (7) enables water vapor evaporating from the PVA film (1) into the atmosphere to be condensed on the surface of the evaporation suppression material or inside the plant cultivation support (6), thereby allowing the plant to utilize the water condensed from the water vapor.

In the use of the plant cultivation system of the present invention, the nutrient fluid (3) containing fertilizer components is fed to the plant through the PVA film (1). On the other hand, in conventional hydroponic cultivation methods in which plant roots are immersed in water (or the nutrient fluid), the surface of the water or nutrient fluid is contacted with the atmosphere, so that bacteria and fungi in the atmosphere will easily intrude into the plant and grow in plant roots, thus seriously inhibiting the growth of the plant or causing diseases of the plant.

In conventional hydroponic cultivation methods in which plant roots are immersed in water (or the nutrient fluid), plant roots absorb oxygen dissolved in water, and the amount of oxygen dissolved in the water used for the cultivation of the plant must be maintained at least at a certain level. On the other hand, in the use of the plant cultivation system of the present invention, plant roots are present in the atmosphere above the PVA film (1), so that the plant can absorb oxygen from the atmosphere.

In addition, if desired, a mist spraying means (8) (e.g., a valve) for intermittently spraying water, a nutrient fluid or a diluted agrochemical solution may be provided above the PVA film (1). The use of a mist spraying means (8) is advantageous in that it enables the automation of an intermittent spraying of: water for cooling, especially during summer seasons; a nutrient fluid for cooling the environment and for feeding fertilizer components in the form of a foliar spray; and water or a nutrient fluid containing an agrochemical for agrochemical spraying.

In the use of the plant cultivation system of the present invention, roots of the plant cultivated on the PVA film (1), in seeking to absorb a nutrient fluid through the PVA film (1), will be substantially integrated with the PVA film (1). For promoting the "integration" of the roots with the PVA film (1), it is preferred to feed a nutrient fluid to the lower surface of the film (1).

The feeding of a nutrient to the lower surface of the PVA film (1) greatly improves not only the growth of the plant but also the adhesion strength of the roots to the PVA film (1), as compared to the case where only water is fed to the lower surface of the PVA film (1). This shows that the plant absorbs through the film not only water but also fertilizer components. Further, it is considered that, to efficiently absorb water and fertilizer components through the film, the roots need to strongly and tightly adhere to the surface of the film, and that the strong and tight adhesion causes the integration of the roots with the film.

When an excess amount of water is fed to the upper side of the PVA film (1) before the completion of the "integration" of the roots and the film, the plant absorbs water from the upper side of the film which is easier to absorb, thus reducing the necessity of absorbing water from the lower surface of the film. As a result, the integration of the roots with the film tends to become difficult. Therefore, until the roots have been integrated with the film, it is preferred to refrain from feeding an excess amount of water to the upper side of the film. On the other hand, after the integration of the roots with the PVA film (1), the water/nutrient fluid may be fed to the upper side of the film when appropriate.

<Features of Parts of the Plant Cultivation System>

Hereinbelow, explanation is made on the features of parts of the plant cultivation system of the present invention. With respect to such features (or functions), if necessary, reference can be made to the "Detailed description of the invention" and "Examples" of the documents (Patent Documents 1 to 5) by the present inventors.

(PVA Film)

In the plant cultivation system of the present invention, the PVA film for cultivating a plant thereon is indispensable. The method for producing the film used in the present invention and the characteristic features of the film are already explained above. It is preferred that the film has not only the above-mentioned characteristic features but also all the below-mentioned features.

(Integration Test)

It is important that the PVA film used in the plant cultivation system of the present invention is "capable of substantially integrating with the plant roots". In the present invention, a film which is "capable of substantially integrating with the plant roots" means a film which exhibits a peeling strength of 10 g or more with respect to the roots of the plant having been cultivated thereon for 35 days. The "integration test" for measuring the degree of the integration of the film with the plant roots is performed as follows.

The measurement is performed using a "sieve basket-bowl set". The sieve basket-bowl set comprises a sieve basket and a bowl, wherein the sieve basket is accommodated in the bowl. The film to be tested (size: 200 mm×200 mm) is placed on the sieve basket of the sieve basket-bowl set, 150 g of vermiculite (water content: 73%; dry weight: 40 g) is placed on the film on the sieve basket, and two sunny lettuce seedlings (each having at least 1 main leaf) are planted onto the vermiculite. On the other hand, 240 to 300 g of a nutrient fluid is fed to the bowl of the sieve basket-bowl set. The sieve basket containing the film is accommodated in the bowl so that the film is contacted with the nutrient fluid to thereby start cultivating the sunny lettuce seedlings. The cultivation is performed in a greenhouse for 35 days under conditions wherein the temperature is 0 to 25° C., the humidity is 50 to 90% RH, and natural sunlight is used. The thus cultivated plants are removed from the film by cutting the stems and leaves near the roots of the plants. Test specimens each having a width of 5 cm (and a length of about 20 cm) and having the roots adhered thereto are cut out from the film so that the stem of the plant is positioned at the center of each test specimen.

A commercially available clip is attached to a hook hanging from the spring of a spring type balance, and one end of the test specimen obtained above is gripped by the clip, followed by recording the weight (A grams) (corresponding to the tare weight of the test specimen) indicated by the spring type balance. Subsequently, the stem of the plant at the center of the test specimen is held by hand and gently pulled downward to detach (or break away) the roots from the film, while recording the weight (B grams) (corresponding to the applied load) indicated by the spring type balance. The tare weight is subtracted from this value (that is, B grams minus A grams) to thereby obtain a peeling load for a width of 5 cm. This peeling load is designated as the peeling strength of the film.

The peeling strength of the PVA film used in the present invention is preferably 10 g or more, more preferably 30 g or more, and especially preferably 100 g or more.

(Ion Permeability Test)

In the present invention, as a yardstick for determining whether or not the PVA film is "capable of substantially integrating with plant roots", there can be mentioned an ion permeability balance.

When a plant is cultivated using the plant cultivation system of the present invention, the plant absorbs a fertilizer in the form of ions through the film. Therefore, the amount of fertilizer components fed to the plant is influenced by the salt (ion) permeability of the film. It is preferred to use a PVA film having an ion permeability of 4.5 dS/m or less in terms of an electrical conductivity (EC) difference in a water/saline solution system. The EC difference is determined by contacting water with a 0.5 mass % saline solution through the film (wherein the water and the saline solution are placed in separate compartments which are partitioned by the film), and measuring the EC of each of the water and the saline solution 4 days (96 hours) after the start of the contact, and calculating the difference in EC between the water and the saline solution.

The electrical conductivity (EC) difference in a water/saline solution system is more preferably 3.5 dS/m or less, especially preferably 2.0 dS/m or less. The use of such a film enables an appropriate feeding of water or a fertilizer solution to the roots, thereby easily promoting the integration of the roots with the film.

The electrical conductivity (EC) is a yardstick for the amount of salts (or ions) dissolved in a solution, and is also called "specific conductivity". The EC represents an electrical conductivity between two electrodes, each having a cross-sectional area of 1 cm$^2$, which are separated at a distance of 1 cm from each other. The unit used is siemens (S), and the EC value of a solution is expressed in terms of S/cm. However, since the EC of a fertilizer solution is small, unit "mS/cm" (which is 1/1000 of S/cm) is used in the present specification (unit used in accordance with the International System of Units is dS/m, wherein d represents "deci-").

The ion permeability of the film can be measured as follows. Ten (10) grams of a commercially available table salt is dissolved in 2,000 ml of water to prepare a 0.5% saline solution (EC: about 9 dS/m). The measurement is performed using a "sieve basket-bowl set". The sieve basket-bowl set comprises a sieve basket and a bowl, wherein the sieve basket is accommodated in the bowl. The film to be tested (size: 200 to 260 mm×200 to 260 mm) is placed on the sieve basket of the sieve basket-bowl set, and 150 g of water is poured onto the film on the sieve basket. On the other hand, 150 g of the saline solution prepared above is placed in the bowl of the sieve basket-bowl set. The sieve basket containing the film and water is accommodated in the bowl containing the saline solution, and the whole of the resultant system is wrapped with a resin film for wrapping food (a polyvinylidene chloride film, trade name: Saran Wrap (registered trademark), manufactured and sold by Asahi Kasei Corporation) to prevent the evaporation of water from the system. The resultant system is allowed to stand still at room temperature, and the EC values of the water and the saline solution are measured every 24 hours. More specifically, a small amount of a sample (i.e., the water or the saline solution) is placed, using a dropper, on a measuring portion (sensor portion) of an electrical conductivity meter for measuring the electrical conductivity defined above, to thereby measure the electrical conductivity of the sample.

(Water/Glucose Solution Permeability Test)

In the present invention, for facilitating the absorption of nutrient (organic matter) by plant roots through the PVA film, it is preferred that the PVA film also exhibits a specific level of glucose permeability. It is preferred that the PVA film having such an excellent glucose permeability exhibits a Brix concentration (%) difference of 4 or less as determined between water and a 5% aqueous glucose solution at the cultivation temperature, wherein the Brix concentration (%) difference is determined by a method comprising contacting water with the glucose solution through the film (wherein the water and the glucose solution are placed in separate compartments which are partitioned by the film), measuring the Brix concentration (%) of each of the water and the glucose solution three days (72 hours) after the start of the contact, and calculating the difference in Brix concentration (%) between the water and the glucose solution. The Brix concentration (%) difference is more preferably 3 or less, still more preferably 2 or less, especially preferably 1.5 or less.

The glucose solution permeability of the film can be measured as follows.

A 5% glucose solution is prepared using a commercially available glucose (dextrose). A "sieve basket-bowl set" which is the same as that used in the above-mentioned ion permeability test is used. The PVA film to be tested (size: 200 to 260 mm×200 to 260 mm) is placed in the sieve basket of the sieve basket-bowl set, and 150 g of water is poured onto the film. On the other hand, 150 g of the glucose solution prepared above is placed in the bowl of the sieve basket-bowl set. The sieve basket containing the film and water is accommodated in the bowl containing the glucose solution, and the whole of the resultant system is wrapped with a resin film for wrapping food (a polyvinylidene chloride film, trade name: Saran Wrap (registered trademark), manufactured and sold by Asahi Kasei Corporation) to prevent the evaporation of water from the system. The resultant system is allowed to stand still at room temperature, and the sugar contents (Brix concentration (%)) of the water and the glucose solution are measured every 24 hours using a Brix meter.

(Water Pressure Resistance)

In the present invention, it is preferred that the PVA film has a water impermeability of 10 cm or more, in terms of water pressure resistance. This is because the use of such a PVA film promotes the integration of the roots with the film. Further, the use of such a PVA film is advantageous for easily providing sufficient oxygen supply to the roots and for preventing the contamination by pathogenic bacteria.

The water pressure resistance of a film can be measured according to JIS L1092 (method B). It is preferred that the water pressure resistance of the PVA film used in the present invention is 10 cm or more, more advantageously 20 cm or more, still more advantageously 30 cm or more, and especially advantageously 200 cm or more.

<Plant Cultivation Support>

In the plant cultivation system of the present invention, to protect the plant roots, a plant cultivation support (such as soil) can be disposed on the PVA film. With respect to the plant cultivation support, there is no particular limitation. Any of conventional soils or culture media can be used. As such soils or culture media, there can be mentioned, for example, a soil for use in soil cultivation and a culture medium for use in hydroponic cultivation.

Examples of inorganic materials usable as the plant cultivation support include natural materials, such as sand, gravel and pumice sand; and processed materials (e.g., a high temperature calcination product), such as a rock fiber, vermiculite, perlite, ceramics and a carbonized rice hull. Examples of organic materials usable as the plant cultivation support include natural materials, such as peat moss, coconut fiber, bark medium, hull, peat (Nitan) and peat grass (Sotan); and synthetic materials, such as particulate phenol resin. The above-mentioned materials can be used individually or in any combination. Further, woven or nonwoven fabrics made of synthetic fibers can also be used.

To the cultivation support explained above, a minimum required amount of a nutrient (e.g., a fertilizer and micronutrient components) may be added. With respect to such a nutrient added to the cultivation support, according to the finding of the present inventors, it is preferred to add a nutrient to the plant cultivation support on the PVA film in such an amount as required until the roots of a plant grows to a degree such that the plant is capable of absorbing water or a nutrient fluid through the PVA film, in other words, until the roots integrate with the film.

<Nutrient Fluid Retaining Means>

The plant cultivation system of the present invention comprises a nutrient fluid retaining means for holding a nutrient fluid below the PVA film. As the nutrient fluid retaining means, there can be used one having the shape of a container for accommodating a nutrient fluid, and a nutrient fluid retaining layer having a water impermeable surface and functioning as a substrate.

With respect to the nutrient fluid retaining means having the shape of a container for accommodating a nutrient fluid, there is no particular limitation so long as it is a container capable of retaining a desired amount of the nutrient fluid. As the material for the nutrient fluid retaining means, from the viewpoint of weight saving, easy molding and cost savings, there can be advantageously used general purpose plastics, such as polystyrene, polypropylene, polyvinyl chloride, polyethylene and polyacrylate. For example, conventional hydroponic tanks can be used.

With respect to the water impermeable surface of the nutrient fluid retaining layer, there is no particular limitation so long as it is made of a water impermeable material. Examples of such materials include synthetic resins, wood, metals and ceramics. With respect also to the shape of the nutrient fluid retaining layer, there is no particular limitation. For example, the nutrient fluid retaining layer may be in the form of a film, a sheet, a plate or a box.

With respect to the nutrient fluid feeding means, there is no particular limitation so long as it is conventionally used for continuous or intermittent feeding of water or a nutrient fluid. In the present invention, it is preferred to use a drip irrigation tube (also called "drip tube"), which is capable of feeding a nutrient fluid bit by bit. By the drip irrigation using a drip irrigation tube, it becomes possible to feed water and fertilizers in a minimum amount necessary for the growth of the plant.

Also, in the embodiment in which the plant cultivation system comprises both a nutrient fluid retaining layer and a nutrient fluid feeding means, a water absorbing material can be disposed between the PVA film and the water impermeable surface of the nutrient fluid retaining layer in order to assist the feeding of the nutrient fluid to the PVA film. With respect to the water absorbing material, there is basically no particular limitation so long as it is capable of absorbing and retaining water therein. For example, use can be made of a sponge or nonwoven fabric made of a synthetic resin; a woven fabric; fibers, chips and powder of plant origin; and other materials generally used as a plant cultivation support, such as peat moss and moss.

With respect to the plant which can be cultivated using the plant cultivation system of the present invention, there is no particular limitation. All plants that are usually grown in the fields of agriculture, forestry or gardening can be cultivated using the plant cultivation system of the present invention.

<Cultivation Method>

The cultivation method of the present invention comprises:

(1) providing a plant cultivation system comprising:
a PVA film for cultivating a plant thereon,
a nutrient fluid for promoting the growth of the plant, the nutrient fluid being disposed to be in contact with the lower surface of the PVA film, and
a nutrient fluid retaining means for retaining the nutrient fluid below the PVA film, (2) placing the plant on the PVA film of the plant cultivation system, and (3) causing the nutrient fluid to be in contact with the plant through the PVA film, thereby cultivating the plant on the PVA film.

The plant to be cultivated using the plant cultivation system of the present invention can be disposed in the form of seeds or seedlings on the PVA film having absorbed a nutrient fluid therein. In the case where the plant is disposed in the form of seeds on the PVA film, it is necessary to sprout and root the seeds and, for this purpose, a small amount of irrigation is performed. Since the presence of a large amount of water on the film prevents the integration of the plant roots with the film, the amount of irrigation must be limited to a minimum one necessary for sprouting and rooting the seeds.

On the other hand, in the case where the plant is disposed in the form of seedlings on the PVA film, there is no need of irrigation for sprouting or rooting. However, the neighborhood of the plant roots must be kept wet to prevent the drying of the plant roots until the plant roots extend and integrate with the film so as to be capable of absorbing water and nutrient components from the film.

It is preferred that a plant cultivation support having high water retention characteristics is disposed on the film, since the neighborhood of the plant roots can be easily kept wet while preventing a large amount of water from being present on the film.

Hereinbelow, the present invention will be explained in more detail by making reference to the following Examples.

EXAMPLES

PVA Film Production Examples

Example 1 (F-1)

Using a constant volume pump, an aqueous solution of polyvinyl alcohol obtained by dissolving 40 parts of a PVA (average saponification degree: 99.7 mol %; average polymerization degree: 1,700; 4% aqueous solution viscosity as measured at 25° C.: 40 mPa·s; sodium acetate content: 0.3% in 60 parts of water was fed to a twin-screw kneading extruder (screw L/D ratio=40) having a jacket temperature of 60 to 150° C. to perform an extrusion at a discharge rate of 500 kg/hr. The resultant extrusion product was immediately sent under pressure to a single-screw extruder (screw L/D ratio=30) and kneaded therein at a temperature of 85 to 140° C. The resultant kneaded product was cast through a T-die onto a cast roll having been cooled to 5° C. and was solidified thereon, thereby producing a cooled film. The cooled film was released from the cast roll, followed by drying for 30 seconds using 10 rotating heat rolls each having a temperature of 90° C., thereby preparing a PVA film having a water content of 25%.

The PVA film was stretched at a stretch ratio of 3 times in the lengthwise direction, and then stretched at a stretch ratio of 3.5 times in the transverse direction using a tenter stretching machine, thereby obtaining a biaxially oriented PVA film. The PVA film was subjected to a heat treatment (first-stage heat treatment) at 130° C. for 8 seconds, and then subjected to another heat treatment (second-stage heat treatment) at 170° C. for 8 seconds, thereby obtaining a biaxially oriented PVA film (F-1; thickness: 30 μm) having a water content of 0.8%.

The thus obtained film having a thickness of 30 μm was cut at a length of 20.0 cm in the rolling direction and at a length of 20.0 cm in the width direction, thereby obtaining a square-shaped film. The weight of the square-shaped film was measured and found to be 1.55 g. The square-shaped film was immersed in water at 30° C. for 30 minutes. The resultant swollen film had a weight of 2.85 g. The equilibrium degree of swelling of the PVA film as measured in water at 30° C. was calculated to be: $(2.85/1.55) \times 100 = 184\%$.

Example 2 (F-2)

A biaxially oriented PVA film (F-2; thickness: 40 μm) having a water content of 0.8% was obtained in substantially the same manner as in Example 1, except that a PVA film having a water content of 25% was prepared by changing the speeds of the cast roll at 5° C. and subsequent rolls to ones which were each 0.75 time as large as those in Example 1. The equilibrium degree of swelling of the PVA film as measured in water at 30° C. was determined in substantially the same manner as in Example 1 and found to be 183%.

Example 3 (F-3)

A biaxially oriented PVA film (F-3; thickness: 30 μm) having a water content of 0.8% was obtained in substantially the same manner as in Example 1, except that the biaxially oriented PVA film obtained using the tenter stretching machine was subjected to a heat treatment (first-stage heat treatment) at 145° C. for 8 seconds, and then subjected to another heat treatment (second-stage heat treatment) at 180° C. for 8 seconds. The equilibrium degree of swelling of the PVA film as measured in water at 30° C. was determined in substantially the same manner as in Example 1 and found to be 152%.

Example 4 (F-4)

A biaxially oriented PVA film (F-4; thickness: 40 μm) having a water content of 0.8% was obtained in substantially the same manner as in Example 3, except that a PVA film having a water content of 25% was prepared by changing the speeds of the cast roll at 5° C. and subsequent rolls to ones which were each 0.75 time as large as those in Example 3. The equilibrium degree of swelling of the PVA film as measured in water at 30° C. was determined in substantially the same manner as in Example 1 and found to be 152%.

Comparative Example 1 (F-5)

A PVA (average saponification degree: 99.7 mol %; average polymerization degree: 1,700; 4% aqueous solution viscosity as measured at 25° C.: 40 mPa·s; sodium acetate content: 0.3%), 12 parts of glycerol as a plasticizer, and 1.2 parts of polyoxyethylene sorbitan monolaurate as a surfactant were dissolved in water to obtain a 18% aqueous dispersion. In accordance with a cast film forming method, a film was prepared from the aqueous dispersion at a rate of 10 m/min using a film forming machine having an endless belt made of stainless steel. The film was dried at 120° C., thereby obtaining a PVA film (F-5; thickness: 70 μm). The equilibrium degree of swelling of the PVA film as measured in water at 30° C. was determined in substantially the same manner as in Example 1 and found to be 200%.

Comparative Example 2 (F-6)

A PVA film was obtained in substantially the same manner as in Comparative Example 1, except that the rate at which the film was formed was changed to 12 m/min. The PVA film having a thickness of 60 μm was dried at 200° C. for 60 seconds, thereby obtaining a heat-treated film (F-6; thickness: 60 μm). The equilibrium degree of swelling of the PVA film as measured in water at 30° C. was determined in substantially the same manner as in Example 1 and found to be 127%.

Comparative Example 3 (F-7)

Using a constant volume pump, an aqueous solution of polyvinyl alcohol obtained by dissolving 40 parts of a PVA (average saponification degree: 99.7 mol %; average polymerization degree: 1,700; 4% aqueous solution viscosity as measured at 25° C.: 40 mPa·s; sodium acetate content: 0.3%) in 60 parts of water was fed to a twin-screw kneading extruder (screw L/D ratio=40) having a jacket temperature of 60 to 150° C. to perform an extrusion at a discharge rate of 500 kg/hr. The resultant extrusion product was immediately sent under pressure to a single-screw extruder (screw L/D ratio=30) and kneaded therein at a temperature of 85 to 140° C. The resultant kneaded product was cast through a T-die onto a cast roll having been cooled to 5° C. and was solidified thereon, thereby producing a cooled film. The cooled film was released from the cast roll, followed by drying for 30 seconds using 10 rotating heat rolls each having a temperature of 90° C., thereby preparing a PVA film having a water content of 25%. The PVA film was stretched at a stretch ratio of 3 times in the lengthwise direction, and then stretched at a stretch ratio of 3.5 times in the transverse direction using a tenter stretching machine, thereby obtaining a biaxially oriented PVA film. The PVA film was subjected to a heat treatment (first-stage heat treatment) at 165° C. for 8 seconds, and then subjected to another heat treatment (second-stage heat treatment) at 205° C. for 8 seconds, thereby obtaining a biaxially oriented PVA film (F-7; thickness: 25 μm) having a water content of 0.8%. The equilibrium degree of swelling of the PVA film as measured in water at 30° C. was determined in substantially the same manner as in Example 1 and found to be 118%.

Comparative Example 4 (F-8)

With respect to "imec film" (thickness: 65 μm) manufactured and sold by Mebiol Inc., the equilibrium degree of swelling thereof as measured in water at 30° C. was determined in substantially the same manner as in Example 1 and found to be 148%.

Comparative Example 5 (F-9)

With respect to "imec film 2" (thickness: 60 μm) manufactured and sold by Mebiol Inc., the equilibrium degree of swelling thereof as measured in water at 30° C. was determined in substantially in the same manner as in Example 1 and found to be 153%.

Example 5 (Measurement of Dynamic Viscoelasticity)

The film samples (F-1) to (F-9) of Examples 1 to 4 and Comparative Examples 1 to 5 were individually immersed in water at 30° C. for 30 minutes, and a circular film having a diameter of 4 cm was cut out from each film sample. The circular films were individually subjected to measurement of dynamic viscoelastic behavior by means of a stress control type viscoelastic measuring apparatus (rheometer AR-500, manufactured and sold by TA Instruments Japan Inc.). The measurement conditions were as follows.

Shape and size of the measurement cell: stainless steel parallel discs (diameter: 4.0 cm) with an aluminum solvent trap
Measurement frequency: 1 Hz
Measurement temperature: 30° C.
Applied stress and displacement: In a linear region. Specifically, the applied stress was from 10 to 200 Pa, and the displacement was from $10^{-6}$ to $10^{-5}$ radian.

The specific procedure was as follows.

The PVA film having reached an equilibrium swollen state was taken out from the water, and a circular film having a diameter of 4 cm was cut out therefrom so as to be fitted in stainless steel parallel discs (diameter: 4.0 cm) which were used as a measurement device. The solvent trap and water as a solvent were placed on the measurement device while maintaining the film in close contact with the measurement device, and the resultant system was mounted on the measuring apparatus. Next, the measurement stage was elevated, the PVA film to be subjected to the measurement was sandwiched between the measurement device and the measurement stage, and the gap was adjusted so as for the film to be in close contact with the measurement device and the measurement stage. During this operation, care was taken to ensure that no slip occurs among the PVA film, the measurement device and the measurement stage, and that the film not be compressed. The temperature of the measurement stage was set at 30° C., and the dynamic viscoelasticity was measured at a measuring frequency of 1 Hz under conditions such that the stress and displacement were in a linear region. The results of each sample were summarized in Table 1 below for comparison.

Example 6 (Root Penetration Test)

600 ml of a nutrient fluid (Otsuka House A prescription EC=2, manufactured and sold by Otsuka Chemical Co., Ltd.) was placed in a styrene resin tray (lengthwise size: 19.5 cm×transverse size: 12.5 cm×depthwise size: 5.5 cm). Each of PVA films of A4 size produced in Examples and Comparative Examples was individually disposed on the nutrient fluid so that one surface of the film was positioned in contact with the nutrient fluid. Coconut shell chips were placed in an amount of 50 g per 1 $m^2$ on the PVA film to form a soil having a thickness of 1.5 cm, and lawn grass seeds (Western lawn called "perennial ryegrass accent", manufactured and sold by Snow Brand Seed Co., Ltd.) were seeded thereto. The seeds were sufficiently watered by spraying water with a sprayer, and the whole of the resultant system was wrapped with a semitransparent polyethylene film (YK Sheet, manufactured and sold by Yoshikawa Sangyo Company; thickness: 10 μm) to prevent the drying of the system. The wrapped system was kept indoor at 25° C. and cultivated using a fluorescent lamp during the time of from 6:00 to 20:00 under conditions that the illuminance for the period (1st period) of from the seeding time to the time when plant roots have spread and adhered to the PVA film was 2,000 lux, and the illuminance for the period (2nd period) after plant roots have spread and adhered to the PVA film was 6,000 lux, provided that, after the start of the 2nd period, the semitransparent polyethylene film was gradually removed over a few days. The results of the test are shown in Table 1 below for comparison. The root penetration was evaluated in accordance with the following criteria:

"○" (good): the root penetration through the PVA film being observed on or after day 150 from the start of the cultivation;

"x" (poor): the root penetration through the PVA film being observed before day 150 from the start of the cultivation; and "-" (not measurable): the plant growth was poor, and the roots have not spread and adhered to the PVA film.

TABLE 1

| | Thickness of film (μm) | Loss tangent (tan δ) (G"/G') | Equilibrium degree of swelling in water at 30° C. | Number of days until root penetration |
|---|---|---|---|---|
| Example 1 (F-1) | 30 | 0.072 | 184% | ○ (150 days or more) |
| Example 2 (F-2) | 40 | 0.060 | 183% | ○ (150 days or more) |
| Example 3 (F-3) | 30 | 0.044 | 152% | ○ (150 days or more) |
| Example 4 (F-4) | 40 | 0.037 | 149% | ○ (150 days or more) |
| Comparative Example 1 (F-5) | 70 | 0.234 | 200% | x (59 days) |
| Comparative Example 2 (F-6) | 60 | 0.220 | 127% | x (22 days) |
| Comparative Example 3 (F-7) | 25 | 0.048 | 118% | — |
| Comparative Example 4 (F-8) | 65 | 0.341 | 148% | x (38 days) |
| Comparative Example 5 (F-9) | 60 | 0.350 | 153% | x (59 days) |

In Examples 1 to 4, the plant growth was good, the plant roots well spread and adhered to the PVA film, and the occurrence of root penetration through the PVA film was prevented for a period of 150 days or more. On the other hand, in Comparative Example 3, the PVA film exhibited low nutrient component permeability and hence the plant growth was suppressed. In Comparative Examples 1, 2, 4 and 5, the strength of the PVA film was unsatisfactory, so that plant root penetration through the PVA film occurred in a relatively short period of time.

INDUSTRIAL APPLICABILITY

By performing plant cultivation using the plant cultivation system of the present invention employing a PVA film having not only excellent absorption and permeability of water or a nutrient fluid, but also excellent film strength, plant roots can be caused to absorb satisfactory amounts of nutrient components for a long period of time efficiently and stably while avoiding infection by bacteria and the like causative of plant diseases and also preventing plant roots from suffering oxygen deficiency causative of root rot and the like, thereby rendering it possible to remarkably promote plant growth continually for a long period of time. Therefore, the present invention is useful in a wide variety of fields, such as fields involving plant cultivation, for example, agriculture, gardening, and the manufacture of pharmaceuticals.

DESCRIPTION OF REFERENCE NUMERALS

1: PVA film; 2: Hydroponic tank; 3: Nutrient fluid; 4: Plant body; 5: Roots; 6: Plant cultivation support; 7: Evaporation suppression material or planting plate; and 8: Mist spraying means

The invention claimed is:

1. A plant cultivation system comprising:
a biaxially oriented polyvinyl alcohol (PVA) film for cultivating a plant thereon, wherein said PVA film has an equilibrium degree of swelling in a range of from 125 to 200% as measured in water at 30° C., the storage elastic modulus (G') of the PVA film as measured in an equilibrium swollen state in water at 30° C. being in the range 10,000 to 80,000 Pa and the loss elastic modulus (G") of the PVA film as measured in an equilibrium swollen state in water at 30° C. being in the range 300 to 8,000 Pa, and
wherein said PVA film has a loss tangent (tan δ) in a range of from 0.01 to 0.1 as measured in an equilibrium swollen state in water at 30° C., said loss tangent (tan δ) being defined as the ratio of loss elastic modulus (G") to storage elastic modulus (G'), and
a nutrient fluid retaining means disposed to be in contact with a lower surface of the PVA film, wherein said nutrient fluid retaining means is a hydroponic tank accommodating a nutrient fluid which is disposed to be in contact with the lower surface of the PVA film.

2. The plant cultivation system according to claim 1, wherein said PVA film has a dry thickness of from 5 to 100 μm.

3. A method for cultivating a plant, which comprises:
(1) providing a plant cultivation system comprising:
a biaxially oriented PVA film for cultivating a plant thereon, and
a nutrient fluid retaining means disposed to be in contact with a lower surface of the PVA film,
wherein said PVA film has an equilibrium degree of swelling in a range of from 125 to 200% as measured in water at 30° C., the storage elastic modulus (G') of the PVA film as measured in an equilibrium swollen state in water at 30° C. being in the range 10,000 to 80,000 Pa and the loss elastic modulus (G") of the PVA film as measured in an equilibrium swollen state in water at 30° C. being in the range 300 to 8,000 Pa, and
wherein said PVA film has a loss tangent (tan δ) in a range of from 0.01 to 0.1 as measured in an equilibrium swollen state in water at 30° C., said loss tangent (tan δ) being defined as the ratio of loss elastic modulus (G″) to storage elastic modulus (G′), (2) placing a plant on the PVA film of said plant cultivation system, and (3) causing a nutrient fluid to be in contact with the plant through said PVA film, thereby cultivating the plant on the PVA film.

4. The method according to claim 3, wherein said PVA film has a dry thickness of from 5 to 100 μm.

5. The method according to claim 3 or 4, wherein said nutrient fluid retaining means is a hydroponic tank accommodating a nutrient fluid which is disposed to be in contact with a lower surface of the PVA film.

6. The method according to claim 3 or 4, wherein said nutrient fluid retaining means is a material having a water impermeable surface on or above which said PVA film is disposed, and wherein said plant cultivation system further comprises a nutrient fluid feeding means for continuously or intermittently feeding a nutrient fluid to a position between said PVA film and said nutrient fluid retaining means.

7. The method according to claim 6, wherein said nutrient fluid feeding means comprises a drip irrigation tube disposed between said PVA film and said nutrient fluid retaining means.

* * * * *